United States Patent [19]

Oland

[11] 4,007,512
[45] Feb. 15, 1977

[54] RETRACTABLE LUGGAGE ROLLER ASSEMBLY

[75] Inventor: John Hugh Oland, Calgary, Canada

[73] Assignee: Oland Industries Limited, Calgary, Canada

[22] Filed: Apr. 19, 1976

[21] Appl. No.: 677,979

[52] U.S. Cl. .............................. 16/19; 16/DIG. 34; 16/DIG. 39

[51] Int. Cl.² ........................................ B60B 33/04

[58] Field of Search ................ 16/19, 30, DIG. 34, 16/DIG. 39

[56] References Cited

UNITED STATES PATENTS

| 1,543,972 | 6/1925 | Adams | 16/19 |
| 3,534,430 | 10/1970 | Kesling et al. | 16/19 |

FOREIGN PATENTS OR APPLICATIONS

| 224,005 | 7/1966 | Sweden | 16/19 |

Primary Examiner—Werner H. Schroeder
Assistant Examiner—Conrad L. Berman
Attorney, Agent, or Firm—Carver and Company

[57] ABSTRACT

A retractable roller assembly for luggage and the like which has a casing adapted to be secured to the luggage having an elongated opening on a lower edge. The side walls of the casing have a pair of aligned circular sockets which fittedly and rotatably receive circular cheek-plates of a bifurcated yoke. A roller is mounted between the cheek-plates for rotation about an axis eccentric to the axis of rotation of the cheek-plates so that the roller can be moved between a hidden position entirely within the casing and an operative position extending from the casing, by rotatably adjusting the yoke.

5 Claims, 6 Drawing Figures

U.S. Patent
Feb. 15, 1977
4,007,512
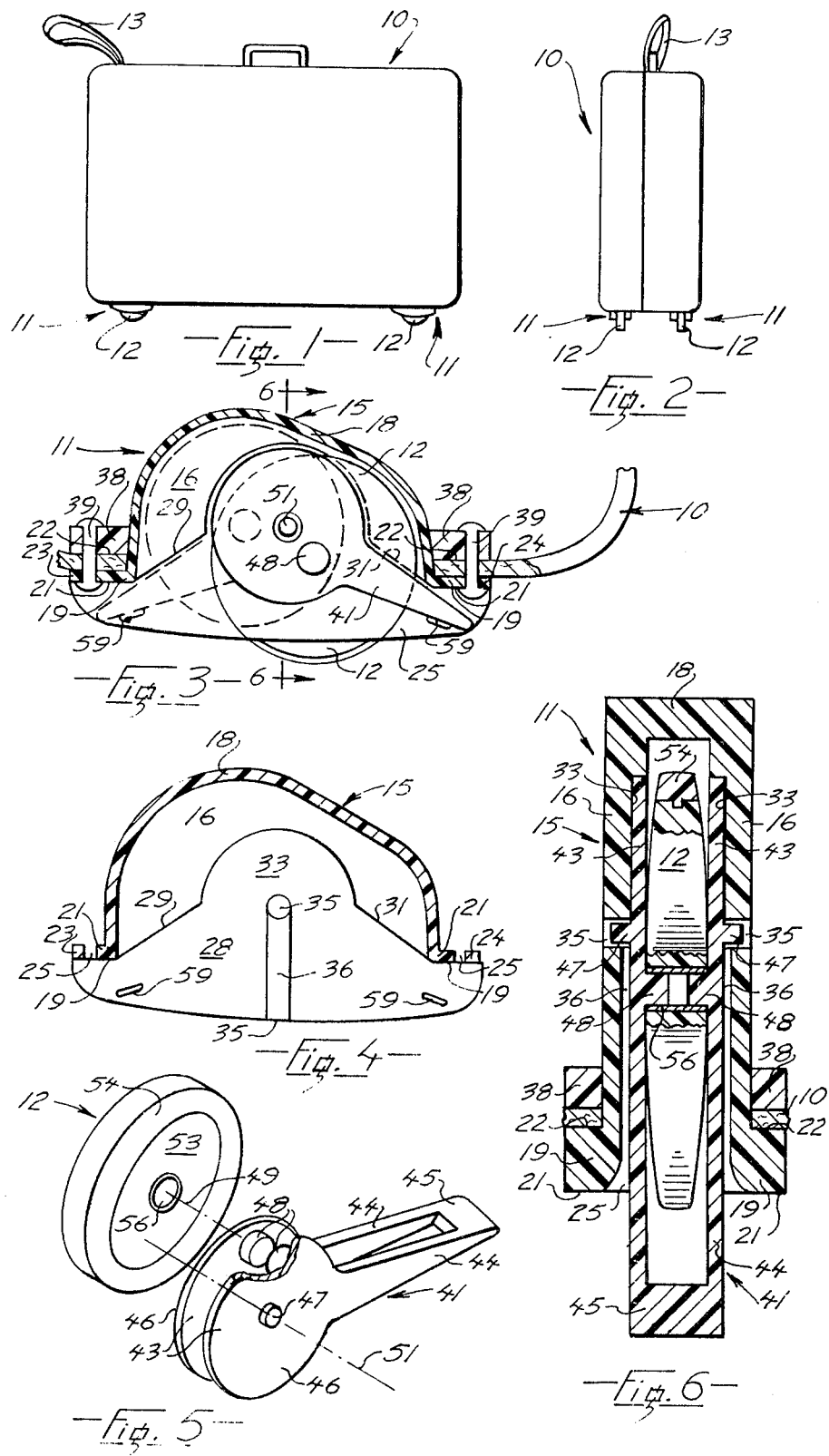

RETRACTABLE LUGGAGE ROLLER ASSEMBLY

BACKGROUND OF THE INVENTION

1. Field of the Invention

This invention relates in general to luggage and in particular to rollers for luggage to enable the luggage to be moved easily over a floor or the like.

2. Prior Art

To facilitate transportation of luggage pieces in airport terminals and the like it has been common practice for some years to mount rollers on the pieces to enable them to be towed rather than carried by the traveller. In some cases the rollers have been devised to be retractable so that the luggage piece can be handled safely particularly when the pieces are allowed to descend through chutes and the like to luggage pick-up areas.

Roller assemblies of the prior art have not been entirely satisfactory as they have normally been difficult to install and, when damaged, are difficult and costly to repair. Furthermore retractable roller assemblies of the prior art are rather bulky and therefore detract from the aesthetic aspect of luggage to which they may be attached.

SUMMARY OF THE INVENTION

The present invention provides a luggage roller assembly having a retractable roller which is relatively easy to install on most luggage, which is relatively inexpensive to manufacture and which is so constructed as to enable its moving parts to be replaced easily if damaged.

The luggage roller assembly of the present invention, furthermore, due to its design characteristics can be made relatively thin so as to match modern luggage pieces, yet which is sufficiently strong to withstand, without appreciable or substantial damage, shock loads on its moving parts due to rough handling.

The present luggage roller assembly has a casing adapted to be secured to a luggage piece having a pair of parallel spaced apart planar side walls and a circumferential wall, the circumferential wall having an elongated opening, the side walls having a pair of co-axially disposed circular sockets in inner surfaces thereof, a yoke having a pair of cheek-plates rotatably fitting in the sockets and a bifurcated lever connecting the cheek-plates and extending from the opening for rotating the check-plates about a common axis, a roller mounted between the cheek-plates for rotation about an axis eccentric to said common axis, the roller having a diameter such that the roller is moved between a hidden position entirely within the casing and a position projecting through the opening in the base when the lever is swung from one end of the opening to the opposite end of the opening.

A detailed description following, related to the drawings, gives exemplification of apparatus according to the invention which, however, is capable of expression in means other than those particularly described and illustrated.

DESCRIPTION OF THE DRAWINGS

FIG. 1 is a side view of a piece of luggage showing the roller assemblies of the invention installed thereon in operative positions, FIG. 2 is an end view of the piece of luggage of FIG. 1, FIG. 3 is an enlarged longitudinally sectional view of the roller assembly showing the roller in extended and retracted positions, FIG. 4 is a longitudinal sectional view of a portion of the casing, FIG. 5 is an exploded perspective view of yoke and roller of the assembly, portions thereof being broken away from the purposes of clarification, FIG. 6 is a sectional view taken on Line 6—6 of FIG. 3 showing the roller disposed in position mid-way between its fully retracted and extended positions.

DETAILED DESCRIPTION

Referring to the drawings, FIGS. 1 and 2 show a luggage piece 10 to which roller assemblies in accordance with the invention and designated generally 11 are attached. The assemblies have rollers, generally 12, which are shown in extended or operative positions. The luggage piece, conventionally, has a towxng strap 13 by means of which the piece can be, conveniently, towed. The strap can also be used for securing the luggage piece in tandem with another luggage piece so that a number of luggage pieces can be towed by one individual.

Referring to FIGS. 3, 4, 5 and 6, each of the roller assemblies 11 has a thin elongated casing 15 having parallel and planar side walls 16—16 and an upper circumferential wall 18. Lower edges of the side walls have outwardly-turned lips 19—19 which have substantially straight and parallel lower edge surfaces 21—21. The projecting lips have flat co-planar upper surfaces 22—22. The peripheral wall terminates short of the lower edges of the lips and have fore and aft extending flange portions 23 and 24, upper surfaces of which are co-planar with the upper surfaces 22 of the lips. The lips and flanges thus define a substantially rectangular opening 25 into the casing.

The inner surfaces of each of the side walls from each lip upwards is partially relieved to provide a flat-bottomed relieved portion 28 having a lower triangular portion upper edges 29 and 31 of which slope upwards and inwards from opposite lower edges from the circumferential wall to a downwardly opening flat-bottomed semi-circular socket 33. Each side wall also has a small cylindrical opening 35 centered in the socket 33. A groove 36 is provided in each side wall extending vertically across the lower relieved portion from the lip to the opening 35.

Referring to FIGS. 3 and 6, in securing the casing to the luggage piece, a suitably located opening is formed in the lower surface of the luggage piece and the casing then inserted from the bottom into the opening thus formed up to the upper surfaces of the lips and the flanges and a rectangularly-shaped securing piece 38 is fitted over the casing on the inside of the luggage piece and secured as by rivets 39 to the flanges 23 and 24. For extra strength the rectangular securing piece can also be secured along its length by rivets (not shown) extending through the lips. The entire casing can be molded as a unitary structure of a suitable thermo-plastic material, such as nylon. Likewise, the securing piece can be of thermo-plastic construction.

The roller assembly 11 includes a yoke 41 which is mounted for swinging movement in the sockets and which supports the roller 12. The yoke, see in particular FIG. 5, has a pair of circular cheek-plates 43—43, the diameter of which is such that they have a snug, yet rotatable, fit in the sockets, and lever arms 44—44 which extend from the periphery of each of the cheek-plates. The lever arms, at their free ends, are connected by a bridging piece 45. Thickness of cheek-plates is equal to the depth of the sockets and each cheek-plate has projecting from its outer surface 46, a centrally-located projection 47, the diameter of each of which is less than the diameter of the opening 35 so as to have a loose fit in the openings 35 when the cheek-plates are seated in their respective sockets. From the inner surfaces of the cheek-plates project a pair of aligned stub-axles 48—48 having a common axis 49 which is eccentric to the axis 51 of the cheek-plates. The yoke, like the casing, is also made of a suitable thermo-plastic and can be molded as a unitary structure.

The roller 12 which is also, preferably, thermo-plastic construction has a central wheel portion 53 formed of a relatively hard thermo-plastic so as to retain its shape under load and a tire portion 54 having sufficient elasticity to absorb shock and provide for quiet running over floor surface. The wheel portion has a central metallic sleeve 56 having a rotatable snug fit over the stub-axles 48. Width of the casing and thickness of the roller and yoke are such that with the yoke and roller fitted in the casing the side walls bear against the outer surfaces of the cheek-plates and the cheek-plates bear against the roller so that the cheek-plates are firmly pressed and maintained in the sockets. The roller, shown in FIG. 6, tapers from near its middle outwards to its periphery so that only a small radially inward portion of the roller is in frictional engagement with the cheek-plates.

The yoke, refer to FIG. 3, can be swung between an operative position, as shown in solid outline, against the flange 24 and a non-operative position, shown in broken outline, against the flange 23. The diameter of the roller and its eccentricity is such that with the yoke in the operative position the roller extends below the lips whereas in its non-operative position the roller is retracted entirely within the casing. Further, as the yoke is swung between operative and non-operative positions the rotational axis of the roller swings through an over-center position so that the roller will tend to remain in its extended position under the weight of the luggage piece. Detents 59 which project from the inner surface of the lips between which and over which the lever arms have a snap fit are also provided to releasably maintain the yoke in its operative and non-operative positions.

In fitting the yoke and the roller in the casing, the yoke is first spread to enable the stub-axles to be inserted into the roller sleeve, then the yoke and roller combination is fitted into the casing opening 25 with the projections 47 aligned with the grooves 36. The yoke is then forced into the casing, spreading the side walls apart slightly, until the projections 47 enter the openings 35. The cheek-plates at the same time will enter and seat in the sockets.

It is seen that as the projections 47 have a loose fit in the openings 35, the entire weight of the case is applied to the roller through the engagement of the periphery of the cheek-plates with the walls of the sockets and none of the force is transferred through the projections 47. The cheek-plates can thus be relatively thin, yet still provide relatively extensive bearing surfaces. Further, as the bearing surface is relatively near the peripheral wall, spreading of the side walls under load is minimized in the area in which contact is made between the cheek-plates and the side walls. Consequently, the side walls can also be made much thinner than if the cheek-plate projections 47 were to take the full load of the luggage piece.

Construction of the roller assembly as described above, also enables the roller and yoke to be replaced if they are damaged. To remove the yoke, it is only necessary to slide a pair of probes, such as a pair of small screw drivers, down each of the slots and then spread the side walls apart to provide clearance for the projections 47 so that the entire yoke and roller assembly can be withdrawn from the casing.

I claim:

1. A retractable roller assembly for portable luggage pieces and the like comprising:
   a. a casing adapted to be secured to the luggage piece having a pair of parallel spaced apart planar side walls and a circumferential wall, the circumferential wall having an elongated opening,
   b. the side walls having a pair of co-axially disposed circular sockets in inner surfaces thereof,
   c. a yoke having a pair of cheek-plates rotatably fitting in the sockets and a bifurcated lever connecting the cheek-plates and extending from the opening for rotating the cheek-plates about a common axis,
   d. a roller mounted between the cheek-plates for rotation about an axis eccentric to said common axis, the roller having a diameter such that the roller is moved between a hidden position entirely within the casing and a position projecting through the opening in the base when the lever is swung from one end of the opening to the opposite end of the opening.

2. A roller assembly as claimed in claim 1 including an opening in each side wall centered relative to a socket and a pin projecting outwards from each plate having a loose fit in each of the side wall openings.

3. A roller assembly as claimed in claim 1 in which the cheek-plates have a pair of inwardly projecting axially aligned stub-shafts eccentric to the rotational axis of the cheek-plates and the roller has a central opening for slidably and rotatably receiving the stub-shafts.

4. A roller assembly as claimed in claim 1 in which the roller tapers inwards from near its middle to its periphery so as to provide clearance between a peripheral portion of the roller and cheek-plates.

5. A retractable roller assembly as claimed in claim 1 in which the side walls terminate in thickened lip portions having substantially flat floor engaging under-surfaces for supporting the luggage piece when the roller is disposed in its hidden position.

* * * * *